United States Patent
Naraoka et al.

(10) Patent No.: US 11,431,189 B2
(45) Date of Patent: Aug. 30, 2022

(54) POWER CONTROL CIRCUIT

(71) Applicant: YOKOGAWA ELECTRIC CORPORATION, Tokyo (JP)

(72) Inventors: Jun Naraoka, Tokyo (JP); Tsuyoshi Nakahira, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/097,030

(22) Filed: Nov. 13, 2020

(65) Prior Publication Data

US 2021/0152015 A1    May 20, 2021

(30) Foreign Application Priority Data

Nov. 15, 2019    (JP) .............................. JP2019-207419

(51) Int. Cl.
*H02J 9/06*    (2006.01)
*H02J 7/00*    (2006.01)
*H02J 7/34*    (2006.01)

(52) U.S. Cl.
CPC ............ *H02J 9/06* (2013.01); *H02J 7/00306* (2020.01); *H02J 7/345* (2013.01); *H02J 2207/50* (2020.01)

(58) Field of Classification Search
CPC .......... H02J 9/06; H02J 7/00306; H02J 7/345; H02J 2207/50
USPC ........................................................ 307/19
See application file for complete search history.

(56) References Cited

U.S. PATENT DOCUMENTS

| | | | |
|---|---|---|---|
| 11,198,405 B2* | 12/2021 | Shimamoto | ............... H02J 7/34 |
| 2001/0011844 A1* | 8/2001 | Ernst | ......................... G06F 1/30 |
| | | | 307/64 |
| 2018/0287408 A1* | 10/2018 | Kutkut | .................. H02J 7/0068 |

FOREIGN PATENT DOCUMENTS

| | | |
|---|---|---|
| JP | 2006-158028 A | 6/2006 |
| JP | 2006-254698 A | 9/2006 |
| JP | 2016-082824 A | 5/2016 |
| JP | 2018-098823 A | 6/2018 |
| WO | 2010/082506 A1 | 7/2010 |
| WO | 2019208203 A1 | 10/2019 |

* cited by examiner

*Primary Examiner* — Michael R. Fin
(74) *Attorney, Agent, or Firm* — Osha Bergman Watanabe & Burton LLP (57) ABSTRACT

A power control circuit includes: a lithium-ion capacitor (LIC) charged by power supplied by a power source; a first protection circuit supplying, to a first load operating using power supplied by the external power source, a first discharge current of the LIC when the power is no longer supplied from the power source; and a second protection circuit supplying, to a second load operating using the power, a second discharge current of the LIC when the power is no longer supplied. The second load operates at a lower power consumption than the first load. The first protection circuit stops supplying the first discharge current to the first load when a voltage of the LIC becomes less than a first voltage. The second protection circuit stops supplying the second discharge current to the second load when the voltage becomes less than a second voltage being lower than the first voltage.

7 Claims, 6 Drawing Sheets

FIG. 1

PRIOR ART

POWER CONTROL CIRCUIT

TECHNICAL FIELD

The present invention generally relates to a power control circuit.

BACKGROUND

Conventional secondary battery packs flow a current whereby a minimal function of an electrical instrument can be performed even after a voltage of a secondary battery used as a power source of the electrical instrument decreases and discharge stops (for example, see patent literature 1).

PATENT LITERATURE

[Patent Literature 1] JP 2006-158028 A

It is required to extend a period of supplying power to a load to be backed up.

SUMMARY

One or more embodiments provide a power control circuit that can extend a period of supplying power to a load to be backed up.

A power control circuit according to one or more embodiments includes: a lithium-ion capacitor that is charged by power supplied by an external power source; a first protection circuit that, when power is no longer supplied from the external power source, supplies a discharge current of the lithium-ion capacitor to a first load that operates using the power supplied by the external power source; and a second protection circuit that, when power is no longer supplied from the external power source, supplies the discharge current of the lithium-ion capacitor to a second load that operates at a lower power consumption than the first load. The first protection circuit stops supplying the current to the first load when a terminal voltage of the lithium-ion capacitor becomes less than a first voltage, and the second protection circuit stops supplying the current to the second load when the terminal voltage of the lithium-ion capacitor becomes less than a second voltage that is lower than the first voltage. This enables the power control circuit to stop the first load in a state wherein a charge amount of the lithium-ion capacitor is left at no less than a predetermined value when using the lithium-ion capacitor as a backup power source of the first load and the second load. As a result, a period of being able to supply power to the second load is extended.

In a power control circuit according to one or more embodiments, the first protection circuit may be provided with a first switching element that is connected between the lithium-ion capacitor and the first load and a first voltage detection circuit that controls the first switching element, and the first voltage detection circuit may be configured to be operable by a current that is supplied from the lithium-ion capacitor via the first switching element when power is no longer supplied from the external power source, maintain the first switching element in an on state when the terminal voltage of the lithium-ion capacitor is no less than the first voltage, and transition the first switching element to an off state when the terminal voltage of the lithium-ion capacitor becomes less than the first voltage. This prevents the first protection circuit from needlessly consuming power after the first load is stopped. As a result, a period of being able to supply power to the second load is extended.

In a power control circuit according to one or more embodiments, the first protection circuit may be configured so the lithium-ion capacitor can connect to the external power source via the first switching element, and the first switching element may be configured so a current heading from the external power source to the lithium-ion capacitor flows even when the first switching element is transitioned to the off state. This charges the lithium-ion capacitor when the external power source is restored, regardless of a state of the first protection circuit. As a result, reversion at power restoration becomes easy.

In a power control circuit according to one or more embodiments, the lithium-ion capacitor may be mounted on a circuit board together with the first load, a temperature of the lithium-ion capacitor may increase as a heat generation amount of the first load increases, and a lower limit of the terminal voltage of the lithium-ion capacitor may correspond to the first voltage when the temperature of the lithium-ion capacitor is higher than a predetermined temperature and correspond to the second voltage when the temperature of the lithium-ion capacitor is no greater than the predetermined temperature. This causes the lithium-ion capacitor to be utilized in a voltage range that is as wide as possible within a usage temperature range thereof. As a result, a period of being able to supply power to the second load is extended.

According to one or more embodiments, a power control circuit is provided that can extend a period of supplying power to a load to be backed up.

DETAILED DESCRIPTION

Embodiments of the present invention will be described in comparison with comparative examples.

Figure 1:
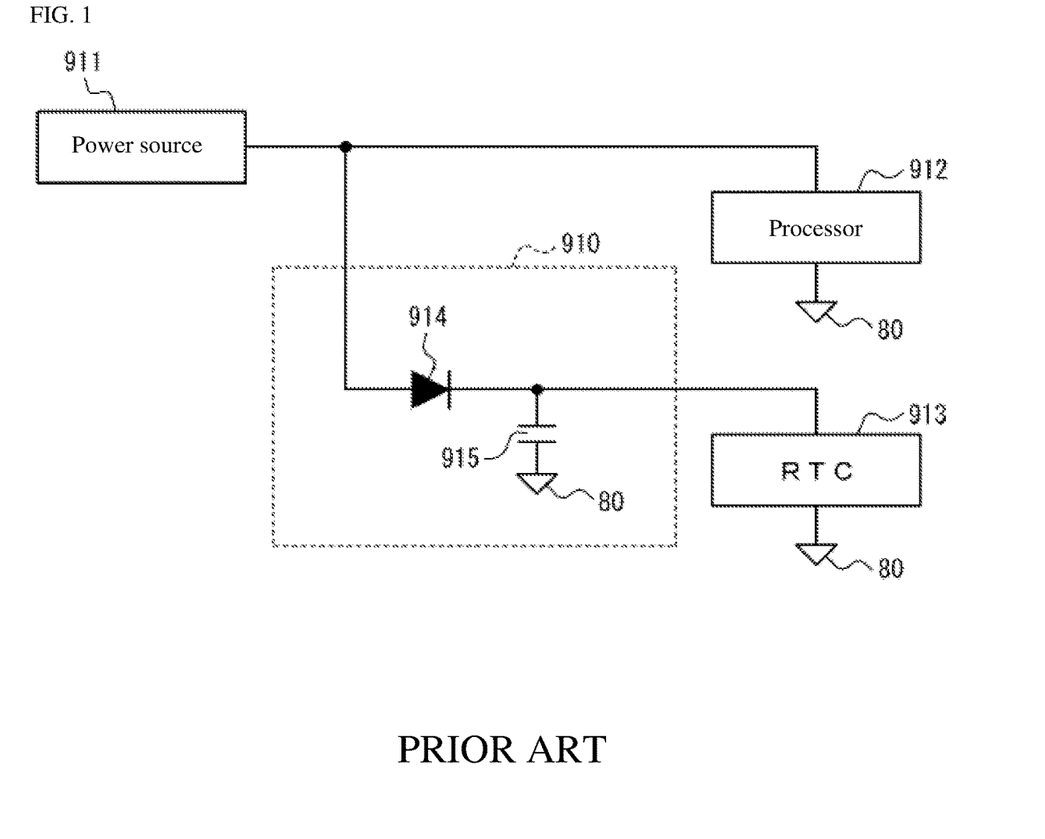
FIG. 1 is a circuit diagram of a power control circuit of comparative example 1.

Comparative Example 1 will be described below. As illustrated in FIG. 1, a power control circuit 910 of comparative example 1 includes a power source 911, a processor 912, and an RTC (real-time clock) 913. The power source 911 supplies power to the processor 912. When the power source 911 becomes unable to supply power, the processor 912 stops operating.

The power control circuit 910 further includes a diode 914 connected in series with the RTC 913 and an electric double-layer capacitor 915 connected in parallel to the RTC 913. The power source 911 supplies power to the RTC 913 via the diode 914 and supplies power to the electric double-layer capacitor 915 to charge the electric double-layer capacitor 915. When the power source 911 becomes unable to supply power, the electric double-layer capacitor 915 discharges and supplies power to the RTC 913. The RTC 913 can operate using the power discharged by the electric double-layer capacitor 915. As a result, the power control circuit 910 can function as a backup power source for the RTC 913.

However, the electric double-layer capacitor 915 self-discharges easily. Therefore, the electric double-layer capacitor 915 is not suited for a usage of backing up a load over a long period.

In FIG. 1, when the electric double-layer capacitor 915 is substituted with a primary battery such as a button battery, the primary battery can function as the backup power source of the RTC 913. However, the primary battery cannot be charged and thus needs to be replaced. Moreover, a circuit needs to be added so the primary battery starts backup when the power source 911 is stopped.

Furthermore, the power control circuit 910 can only back up the one system linked to the RTC 913, and a separate backup power source needs to be provided for the processor 912.

Figure 2:
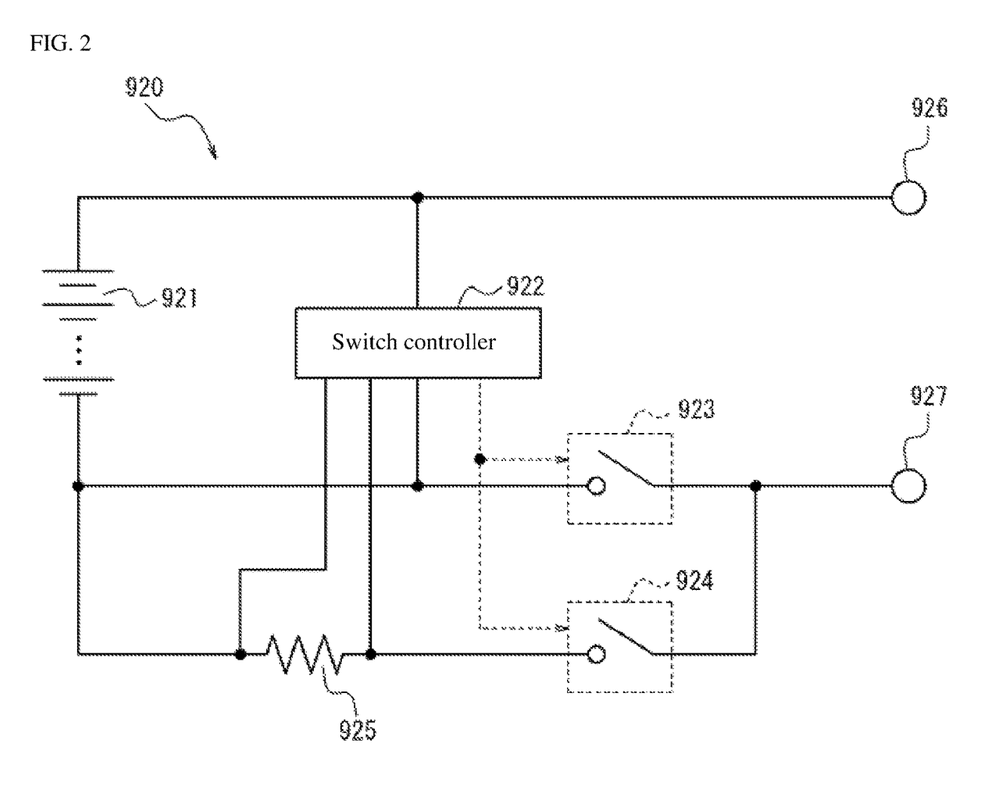
FIG. 2 is a circuit diagram of a power control circuit of comparative example 2.

Comparative Example 2 will be described below. As illustrated in FIG. 2, a power control circuit 920 of comparative example 2 includes a lithium-ion secondary battery 921, a positive-electrode terminal 926, and a negative-electrode terminal 927. The lithium-ion secondary battery 921 may include a plurality of battery cells. A positive electrode of the lithium-ion secondary battery 921 is connected to the positive-electrode terminal 926. A negative electrode of the lithium-ion secondary battery 921 is connected to the negative-electrode terminal 927. The positive-electrode terminal 926 and the negative-electrode terminal 927 are connected to a load. The power control circuit 920 functions as a backup power source for the load by supplying a current from the positive-electrode terminal 926 and the negative-electrode terminal 927 to the load. A charging rate (SOC: state of charge) of the lithium-ion secondary battery 921 is positively correlated to a terminal voltage. That is, the higher the terminal voltage of the lithium-ion secondary battery 921, the higher the SOC. The higher the SOC of the lithium-ion secondary battery 921, the longer discharge can be performed.

The load includes a heavy load that operates at a power consumption that is no less than a predetermined value and a micro load that operates at a power consumption that is less than the predetermined value. The heavy load includes, for example, the processor 912. The micro load includes, for example, the RTC 913.

The negative electrode of the lithium-ion secondary battery 921 and the negative-electrode terminal 927 of the power control circuit 920 are connected by two parallel paths. One path includes a switch 923. The other path includes a series circuit of a switch 924 and a resistor 925. In a closed state, the switches 923 and 924 are conductive, enabling current flow in the wiring. In an open state, the switches 923 and 924 block current flow to the wiring.

The power control circuit 920 further includes a switch controller 922 that controls opening and closing of the switches 923 and 924. The switch controller 922 controls the switches 923 and 924 based on a voltage of the lithium-ion secondary battery 921.

The switch controller 922 closes the switch 923 and opens the switch 924 when the voltage of the lithium-ion secondary battery 921 is no less than a predetermined voltage—that is, when the SOC is no less than a predetermined value. In this situation, the terminal voltage of the lithium-ion secondary battery 921 is output as a voltage between the positive-electrode terminal 926 and the negative-electrode terminal 927 and applied to the load connected between the positive-electrode terminal 926 and the negative-electrode terminal 927.

The switch controller 922 opens the switch 923 and closes the switch 924 when the voltage of the lithium-ion secondary battery 921 is less than a predetermined voltage—that is, when the SOC is less than the predetermined value. In this situation, the lithium-ion secondary battery 921 supplies the current to the load via wiring that includes the resistor 925. The switch controller 922 measures the discharge current of the lithium-ion secondary battery 921 based on a voltage of the resistor 925. When the discharge current of the lithium-ion secondary battery 921 becomes no less than a predetermined value, the switch controller 922 opens the switch 924 and stops the discharge of the lithium-ion secondary battery 921. Upon confirming that the discharge current of the lithium-ion secondary battery 921 becomes less than the predetermined value, the switch controller 922 closes the switch 924 and restarts the discharge of the lithium-ion secondary battery 921. This restricts the discharge current of the lithium-ion secondary battery 921 and extends a duration of discharge.

As for the load, when current supply stops, wiring that supplies the current to the micro load is made conductive and wiring that supplies the current to the heavy load is blocked by a means such as opening and closing the switches 923 and 924. This controls the current supplied to the load overall to be less than the predetermined value. As a result, the switch controller 922 can confirm that the current that flows to the load when the switch 924 is closed is less than the predetermined value. In this situation, the power control circuit 920 can function as a backup power source for the micro load.

The power control circuit 920 can not only function as a backup power source for the micro load as above but also for the heavy load. The power control circuit 920 supplies the backup current to both the micro load and the heavy load from one system composed of the positive-electrode terminal 926 and the negative-electrode terminal 927. In other words, in the power control circuit 920, both the micro load and the heavy load drain the backup current from one system. The heavy load stops draining the current only when the heavy load per se stops operating. Therefore, an operation of the power control circuit 920 supplying the current to only the micro load is dependent on control of the heavy load per se.

Power consumption that does not contribute to load operation occurs at the resistor 925 used to measure the discharge current of the lithium-ion secondary battery 921. This power consumption decreases the discharge duration of the lithium-ion secondary battery 921.

The lithium-ion secondary battery 921 has a narrow usable temperature range and can only be used under limited conditions. When the power control circuit 920 is used in an environment that does not meet these conditions, a reliability thereof decreases.

The lithium-ion secondary battery 921 self-discharges easily. Therefore, the lithium-ion secondary battery 921 is difficult to store as inventory over a long period and is not suited to a usage of backing up a load over a long period.

Overcharging the lithium-ion secondary battery 921 causes early degradation and failure. Therefore, a charge current of the lithium-ion secondary battery 921 needs to be controlled by an overcharge protection circuit. Providing an overcharge protection circuit to the power control circuit 920 makes size reduction difficult. As a result, an installation location of the power control circuit 920 is limited.

The above issues of the lithium-ion secondary battery 921 can also arise when the electric double-layer capacitor 915 in FIG. 1 is substituted with the lithium-ion secondary battery 921.

As above, in the configurations of each comparative example, various improvements of the power control circuits 910 and 920 are required for backing up a load for a long period.

According to one or more embodiments, a power control circuit 1 (see FIG. 3 and the like) can back up a load over a long period. The power control circuit 1 may be applied to a usage of an edge computer gateway. The power control circuit 1 may be used in an IoT (internet of things) gateway terminal.

Figure 3:
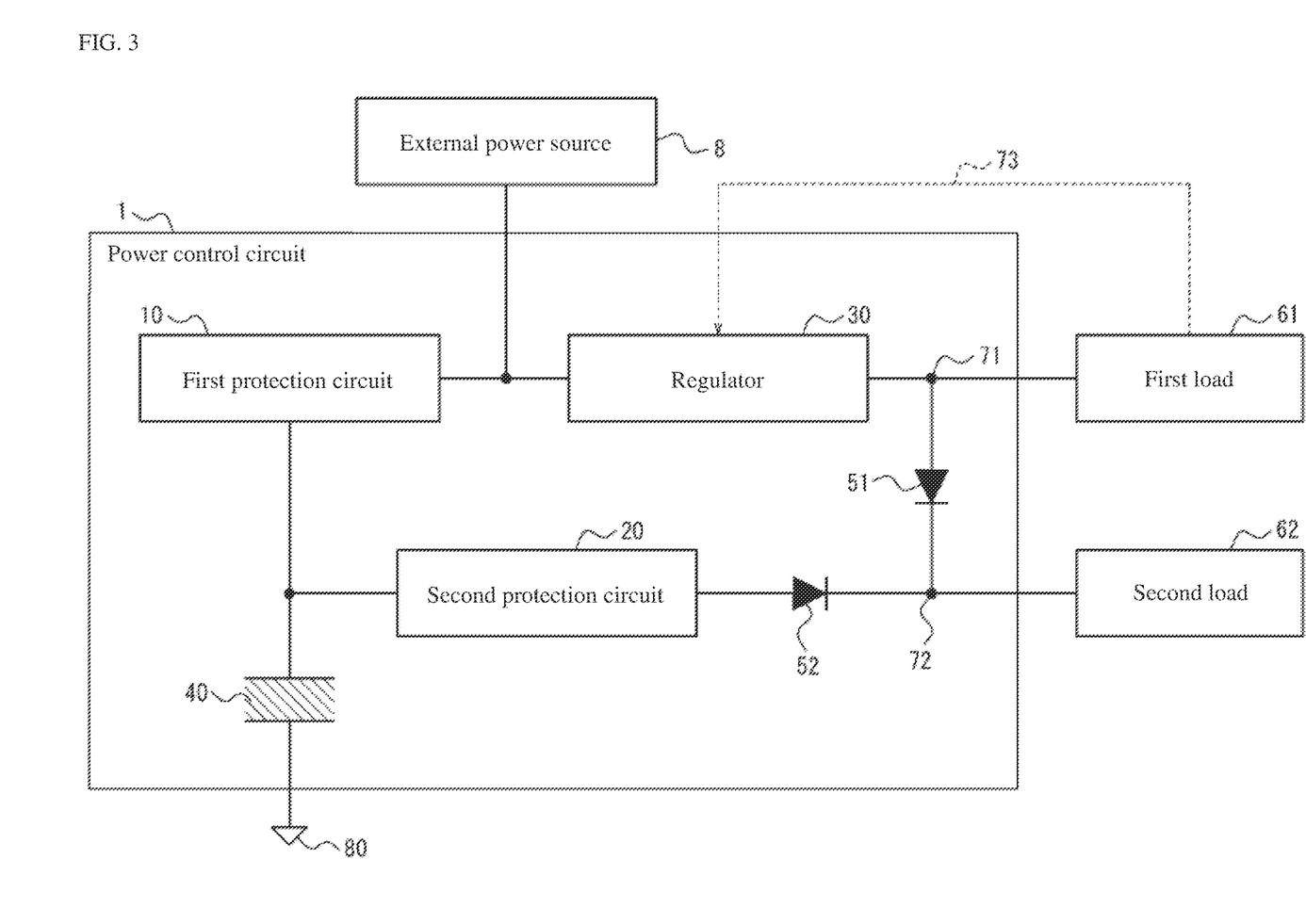
FIG. 3 is a circuit diagram illustrating a configuration example of a power control circuit according to one or more embodiments.

As illustrated in FIG. 3, the power control circuit 1 according to one or more embodiments includes a lithium-ion capacitor 40, a first protection circuit 10, a second protection circuit 20, and a regulator 30. The lithium-ion capacitor 40 has one end connected to a ground point 80 and another end connected to the first protection circuit 10 and the second protection circuit 20. The first protection circuit 10 has one end connected to the lithium-ion capacitor 40 and another end connected to the regulator 30. The regulator 30 has one end connected to the first protection circuit 10 and another end connected to a first load 61. The second protection circuit 20 has one end connected to the lithium-ion capacitor 40 and another end connected to a second load 62 via a diode 52. The diode 52 is connected so a direction heading from the second protection circuit 20 to the second load 62 is a forward direction. The power control circuit 1 has a node 71 that is positioned between the regulator 30 and the first load 61 and a node 72 that is positioned between the diode 52 and the second load 62. The power control circuit 1 further includes a diode 51. The diode 51 is connected between the node 71 and the node 72 so a direction heading from the node 71 to the node 72 is a forward direction. The power control circuit 1 is connected to an external power source 8 from between the first protection circuit 10 and the regulator 30.

The regulator 30 controls power supplied from the external power source 8 so a voltage or a current is a predetermined value and supplies this to the first load 61 and the second load 62. The regulator 30 may be configured as a switching regulator. The regulator 30 may be configured as a step-down switching regulator or a step-up switching regulator.

The lithium-ion capacitor 40 is an electricity storage device that can realize a performance that includes the advantages of both the electric double-layer capacitor 915 and the lithium-ion secondary battery 921. The greater a quantity of an electrical charge that is charged in the lithium-ion capacitor 40, the longer a time over which it can discharge. The electrical-charge amount charged in the lithium-ion capacitor 40 is positively correlated to a terminal voltage. That is, the higher the terminal voltage of the lithium-ion capacitor 40, the greater the electrical-charge amount that is charged. As a result, the higher the terminal voltage, the longer the time over which the lithium-ion capacitor 40 can discharge.

The external power source 8 supplies power to the regulator 30 and can charge the lithium-ion capacitor 40 via the first protection circuit 10. The external power source 8 may include a circuit that controls a charging voltage of the lithium-ion capacitor 40. The external power source 8 may have, for example, a charging upper-limit voltage protection function for the lithium-ion capacitor 40. The external power source 8 may control the voltage whereat the lithium-ion capacitor 40 is charged and a voltage applied to the regulator 30 to be the same voltage or different voltages.

The power supplied by the external power source 8 is supplied to the first load 61, the second load 62, and the lithium-ion capacitor 40. The regulator 30 controls the power supplied from the external power source 8 to be direct-current power of a predetermined voltage and supplies this to the first load 61 and the second load 62. The lithium-ion capacitor 40 is charged by the power supplied from the external power source 8. The external power source 8 may include a charging control circuit that controls the charging of the lithium-ion capacitor 40. The external power source 8 may control the output voltage so the lithium-ion capacitor 40 can be charged in a CCCV (constant current, constant voltage) mode. The regulator 30 can supply the direct-current power of the predetermined voltage to the first load 61 and the second load 62 regardless of the size of the voltage controlled by the external power source 8 to charge the lithium-ion capacitor 40.

When the external power source 8 stops and cannot supply power, the lithium-ion capacitor 40 discharges and supplies power to the first load 61 or the second load 62. The first protection circuit 10 and the second protection circuit 20 control whether to flow or block the current based on the terminal voltage of the lithium-ion capacitor 40.

When the terminal voltage of the lithium-ion capacitor 40 is no less than a first voltage, the first protection circuit 10 provides conductivity between the lithium-ion capacitor 40 and the regulator 30 and supplies the power from the lithium-ion capacitor 40 to the regulator 30. When the voltage of the lithium-ion capacitor 40 is less than the first voltage, the first protection circuit 10 provides blocking between the lithium-ion capacitor 40 and the regulator 30 and stops power supply to the regulator 30.

When the voltage of the lithium-ion capacitor 40 is no less than a second voltage that is lower than the first voltage, the second protection circuit 20 provides conductivity between the lithium-ion capacitor 40 and the second load 62 and supplies the power from the lithium-ion capacitor 40 to the second load 62. When the voltage of the lithium-ion capacitor 40 is less than the second voltage, the second protection circuit 20 provides blocking between the lithium-ion capacitor 40 and the second load 62 and stops power supply to the second load 62.

As above, when the voltage of the lithium-ion capacitor 40 is no less than the first voltage, the first load 61 and the second load 62 can operate using the power supply from the lithium-ion capacitor 40. When the voltage of the lithium-ion capacitor 40 is less than the first voltage and no less than the second voltage, the second load 62 can operate using the power supply from the lithium-ion capacitor 40. Meanwhile, the first load 61 cannot operate without being supplied with power. When the voltage of the lithium-ion capacitor 40 is less than the second voltage, both the first load 61 and the second load 62 cannot operate without being supplied with power.

By blocking power supply to the first load 61 when the voltage of the lithium-ion capacitor 40 becomes less than the first voltage, the power control circuit 1 can stop the first load 61 in a state wherein a charge amount of the lithium-ion capacitor 40 is left at no less than a predetermined value. This secures a power amount that can be supplied to the second load 62. As a result, a period of being able to supply power to the second load 62 is extended.

As above, the power control circuit 1 according to one or more embodiments can function as a backup power source that supplies power to the first load 61 and the second load 62 when the external power source 8 becomes unable to supply power. Moreover, when the charge amount of the lithium-ion capacitor 40 is decreased, the power control circuit 1 can supply power with priority to the second load 62, which needs to be operated over at least a predetermined period. As a result, the power control circuit 1 can back up the second load 62 over the predetermined period while functioning as a backup power source of the first load 61 and the second load 62.

The second load 62 includes a clock circuit such as an RTC. When applied to a usage of an edge computer gateway, the power control circuit 1 supplies backup power to an IoT terminal. The IoT terminal communicates with a server or the like and thereby uploads data to the server. The communication between the IoT terminal and the server or the like is synchronized by the clock. Therefore, in running the IoT terminal, the clock operation is included as one of the operations to be maintained with priority. The power control circuit 1 according to one or more embodiments can meet specifications of a backup power source in a usage of an edge computer gateway.

The first load 61 includes a processor or the like. The first load 61 may be configured to consume a power amount that the lithium-ion capacitor 40 can supply in about several dozen seconds. Meanwhile, the second load 62 may be configured to consume the power amount that the lithium-ion capacitor 40 can supply over about half a year or no less than about one year. That is, the power consumption of the second load 62 may be orders of magnitude smaller than the power consumption of the first load 61. By doing so, even if the IoT terminal adopting the power control circuit 1 is installed in a position that is difficult to be accessed by a worker or the like, continued functioning as a backup power source for the second load 62 is enabled until the worker makes repairs after power is no longer fed from the external power source 8.

The second load 62 may include a storage device such as an SRAM (static random-access memory). When power supply from the external power source 8 stops, the storage device serving as the second load 62 may quickly store information being processed by the processor or the like. This enables the processor to restart operations based on the information from before the stop when power supply from the external power source 8 restarts.

The second voltage corresponds to a lower-limit voltage established as a specification of the lithium-ion capacitor 40. When the lithium-ion capacitor 40 discharges until the terminal voltage of the lithium-ion capacitor 40 becomes less than the lower-limit voltage, a possibility of the lithium-ion capacitor 40 failing increases.

The first voltage is set based on the power consumption of the second load 62 and the time for which the second load 62 is backed up. That is, the first voltage is set so an electrical-charge amount that is discharged as the terminal voltage of the lithium-ion capacitor 40 falls from the first voltage to the second voltage becomes no less than an electrical-charge amount necessary to back up the second load 62 over the predetermined period.

Figure 4:
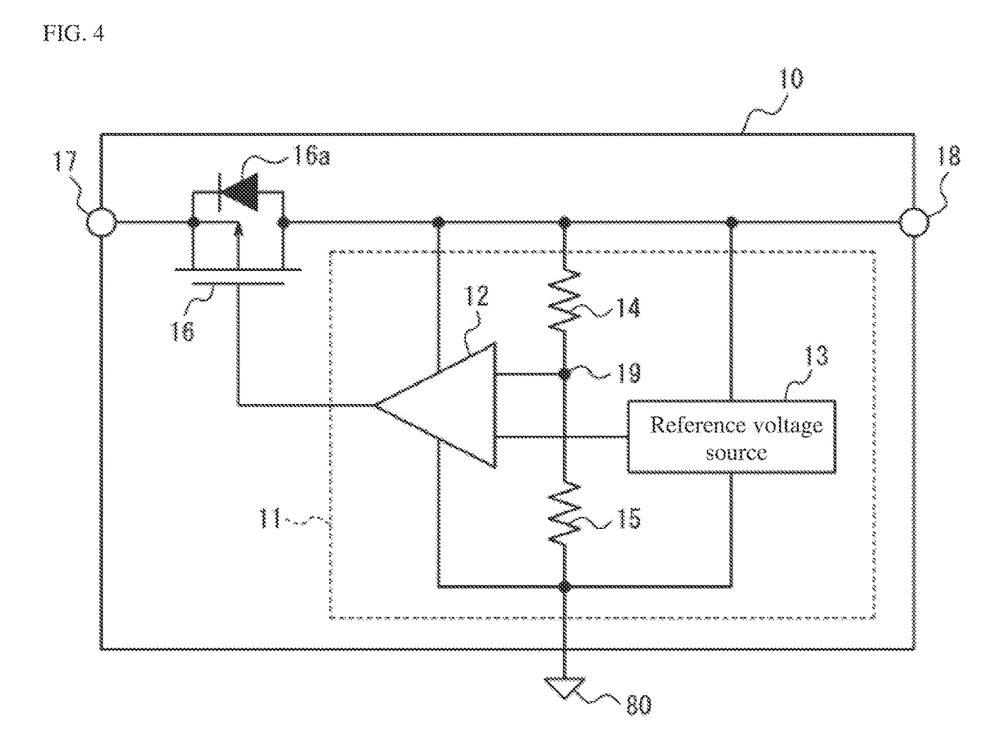
FIG. 4 is a circuit diagram illustrating a configuration example of a first protection circuit according to one or more embodiments.

As illustrated in FIG. 4, the first protection circuit 10 includes a voltage detection circuit 11, a switching element 16, and terminals 17 and 18. The voltage detection circuit 11 is also referred to as a first voltage detection circuit. The switching element 16 is also referred to as a first switching element. The first protection circuit 10 is configured to be connectable to the lithium-ion capacitor 40 by the terminal 17. The first protection circuit 10 is configured to be connectable to the regulator 30 and the external power source 8 by the terminal 18. The first protection circuit 10 is connected to the ground point 80 by the voltage detection circuit 11. The first protection circuit 10 operates using a voltage applied between the terminal 17 or 18 and the ground point 80.

In one or more embodiments, it is supposed that the switching element 16 includes a p-channel MOSFET (metal-oxide-semiconductor field-effect transistor). The switching element 16 may include an n-channel MOSFET. The switching element 16 may include a transistor other than a MOSFET and may include a switch IC (integrated circuit) or the like. The switching element 16 is conductive in an on state and provides blocking in an off state.

The voltage detection circuit 11 includes a comparator 12, a reference voltage source 13, and resistor voltage dividers 14 and 15. The resistor voltage dividers 14 and 15 are connected in series between the terminal 18 and the ground point 80. The resistor voltage dividers 14 and 15 divide the voltage applied between the terminal 18 and the ground point 80. The voltage applied between the terminal 18 and the ground point 80 that is divided by the resistor voltage dividers 14 and 15 is also referred to as a first divided voltage. The first divided voltage is applied to a node 19 positioned between the resistor voltage divider 14 and the resistor voltage divider 15. The reference voltage source 13 is connected between the terminal 18 and the ground point 80 and outputs a first reference voltage.

The comparator 12 has input terminals connected to the reference voltage source 13 and the node 19 and an output terminal connected to a gate of the switching element 16. The comparator 12 is connected between the terminal 18 and the ground point 80 and operates using the voltage applied between the terminal 18 and the ground point 80. When the switching element 16 is in the on state and causing the terminal 17 and the terminal 18 to be conductive, the comparator 12 may operate using a voltage applied from the terminal 17 or a voltage applied from the terminal 18. The comparator 12 has two input terminals and one output terminal. The comparator 12 outputs from the output terminal a signal based on a result of comparing the first reference voltage and the first divided voltage input to the input terminals.

When the first divided voltage is no less than the first reference voltage, the comparator 12 outputs from the output terminal a signal that performs a control whereby the switching element 16 enters the on state. When the switching element 16 is an FET, the comparator 12 outputs a signal having a voltage no less than a gate threshold voltage of the FET. When the first divided voltage is no less than the first reference voltage, the comparator 12 may place the switching element 16 in the on state by outputting the same voltage as the terminal 17 or 18. The switching element 16 maintains the on state by receiving, in the on state, the signal that performs the control whereby the on state is entered. The switching element 16 transitions to the on state by receiving, in the off state, the signal that performs the control whereby the on state is entered.

When the first divided voltage is less than the first reference voltage, the comparator 12 outputs from the output terminal a signal that performs a control whereby the switching element 16 enters the off state. When the switching element 16 is an FET, the comparator 12 outputs a signal having a voltage less than a gate threshold voltage of the FET. When the first divided voltage is less than the first reference voltage, the comparator 12 may place the switching element 16 in the off state by outputting the same voltage as the ground point 80. The switching element 16 transitions to the off state by receiving, in the on state, the signal that performs the control whereby the off state is entered. When the switching element 16 transitions to the off state, the comparator 12 becomes unable to receive a voltage and no longer operates. When the comparator 12 becomes unable to receive a voltage and no longer operates, it outputs no signal. A state wherein the comparator 12 outputs no signal is deemed to be a state wherein the comparator 12 is outputting the signal that places the switching element 16 in the off state. Therefore, when the comparator 12 outputs no signal, the switching element 16 enters the off state. As a result, the switching element 16 is maintained in the off state after transitioning from the on state to the off state. The switching element 16 is also maintained in the off state when the switching element 16 was originally in the off state.

The voltage detection circuit 11 is configured so the first divided voltage is no less than the first reference voltage when the terminal voltage of the lithium-ion capacitor 40 is no less than the first voltage. Specifically, in the voltage detection circuit 11, resistance values of the resistor voltage dividers 14 and 15 and the first reference voltage output by the reference voltage source 13 are appropriately set.

Figure 5:
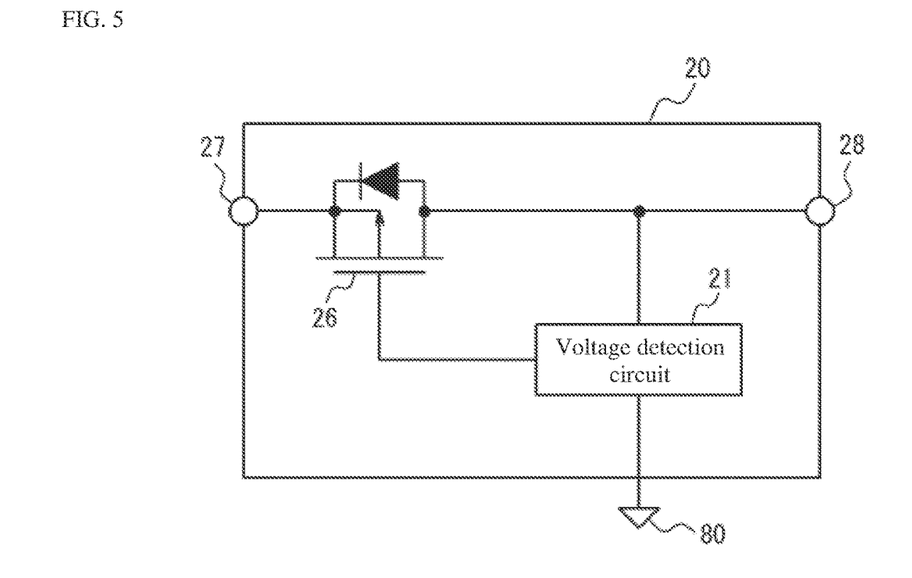
FIG. 5 is a circuit diagram illustrating a configuration example of a second protection circuit according to one or more embodiments.

As illustrated in FIG. 5, the second protection circuit 20 includes a voltage detection circuit 21, a switching element 26, and terminals 27 and 28. The voltage detection circuit 21 is also referred to as a second voltage detection circuit. The switching element 26 is also referred to as a second switching element. The second protection circuit 20 has the terminal 27 connected to the lithium-ion capacitor 40 and the terminal 28 connected to the second load 62. The second protection circuit 20 has the voltage detection circuit 21 connected to the ground point 80. The second protection circuit 20 operates using a voltage applied from the terminal 27 or 28.

In one or more embodiments, it is supposed that the switching element 26 is a p-channel MOSFET. It is supposed that the voltage detection circuit 21 is configured identically to the voltage detection circuit 11 of FIG. 4. The voltage detection circuit 21 generates a second divided voltage that is a division between the terminal 27 or 28 and the ground point 80. The voltage detection circuit 21 generates a second reference voltage.

When the second divided voltage is no less than the second reference voltage, the voltage detection circuit 21 outputs a signal that performs a control whereby the switching element 26 enters an on state. When the switching element 26 is an FET, the voltage detection circuit 21 outputs a signal having a voltage no less than a gate threshold voltage.

When the second divided voltage is less than the second reference voltage, the voltage detection circuit 21 outputs a signal that performs a control whereby the switching element 26 enters an off state. When the switching element 26 is an FET, the voltage detection circuit 21 outputs a signal having a voltage less than a gate threshold voltage.

The voltage detection circuit 21 is configured so the second divided voltage is no less than the second reference voltage when the terminal voltage of the lithium-ion capacitor 40 is no less than the second voltage. The second reference voltage may be identical to the first reference voltage. In this situation, a resistance value of a resistor voltage divider included in the voltage detection circuit 21 may be set so the second divided voltage is identical to the first divided voltage. The first reference voltage and the second reference voltage being made identical enables the reference voltage source 13 to be shared between the voltage detection circuits 11 and 21.

Figure 6:
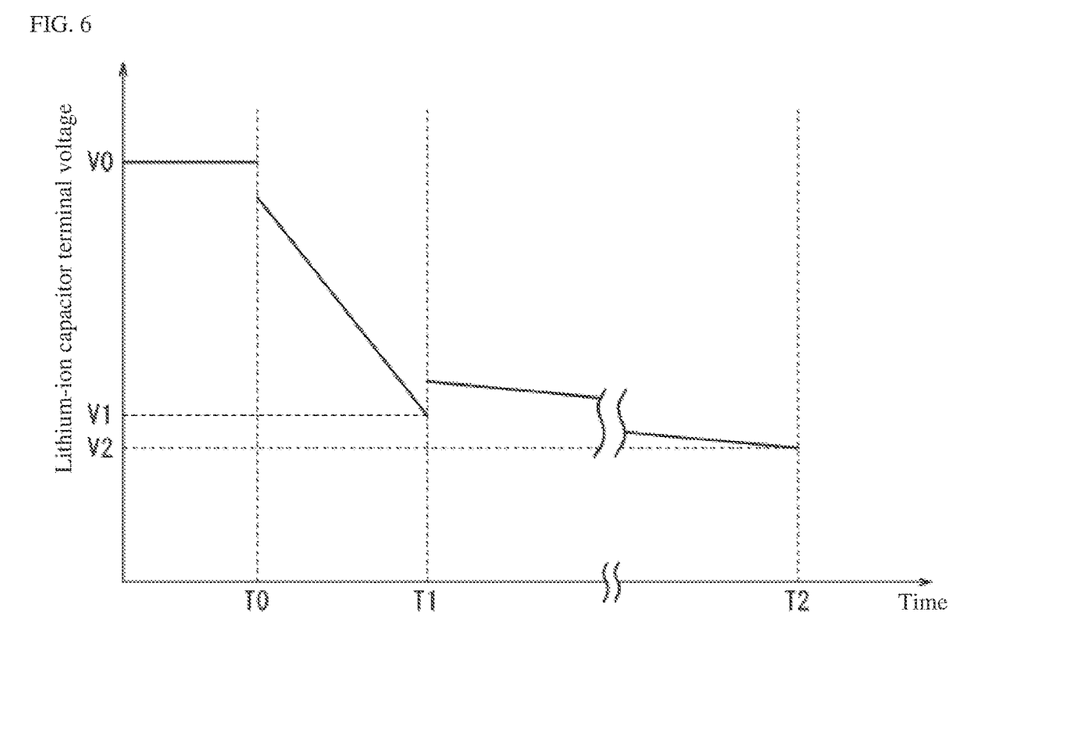
FIG. 6 is a graph illustrating one example of change over time in a terminal voltage of a lithium-ion capacitor according to one or more embodiments.

Change over time in the terminal voltage of the lithium-ion capacitor 40 is described with reference to the graph illustrated in FIG. 6. The horizontal axis represents time. The vertical axis represents the terminal voltage of the lithium-ion capacitor 40.

The lithium-ion capacitor 40 is charged so the terminal voltage is V0 up to time T0 and starts discharging from time T0. At the discharge starting point (time T0), the terminal voltage of the lithium-ion capacitor 40 steps down according to a voltage drop due to an internal resistance of the lithium-ion capacitor 40. The terminal voltage of the lithium-ion capacitor 40 decreases due to discharge and decreases to a first voltage V1 at time T1.

When the terminal voltage of the lithium-ion capacitor 40 becomes the first voltage V1, the first protection circuit 10 provides blocking between the lithium-ion capacitor 40 and the regulator 30. Meanwhile, the second protection circuit 20 maintains conductivity between the lithium-ion capacitor 40 and the second load 62. This maintains power feeding to the second load 62 but stops power feeding to the first load 61.

Stopping power feeding to the first load 61 causes a discharge current of the lithium-ion capacitor 40 to decrease. The decrease in the discharge current causes the voltage drop due to the internal resistance of the lithium-ion capacitor 40 to decrease. As a result, the terminal voltage of the lithium-ion capacitor 40 steps up at time T1. The first load 61 stops operating at a timing when power feeding stops. The terminal voltage of the lithium-ion capacitor 40 stepping up enables the first protection circuit 10 to once again provide conductivity between the lithium-ion capacitor 40 and the regulator 30. In this situation, the first load 61 may be configured so as to not restart operations automatically. For example, the first load 61 may be configured to be able to communicate with the external power source 8 and be configured to restart operations when a signal representing that the external power source 8 has restarted power supply is acquired. This makes a phenomenon wherein the switching element 16 of the first protection circuit 10 changes between the on state and the off state in short increments (phenomenon corresponding to chattering arising in a relay or the like) less likely to occur.

From time T1 onward, the lithium-ion capacitor 40 discharges so as to flow a current needed for the operations of the second load 62. Therefore, the discharge current from time T1 onward is less than the discharge current at time T1 and before. Due to the decreased discharge current, the terminal voltage of the lithium-ion capacitor 40 decreases more gradually than at time T1 and before and decreases to a second voltage V2 at time T2.

When the terminal voltage of the lithium-ion capacitor 40 becomes the second voltage V2, the second protection circuit 20 provides blocking between the lithium-ion capacitor 40 and the second load 62. This stops power feeding to the second load 62.

As above, the power control circuit 1 according to one or more embodiments can function as a backup power source that supplies power to the first load 61 and the second load 62 when the external power source 8 becomes unable to supply power. Moreover, when the charge amount of the lithium-ion capacitor 40 is decreased, the power control circuit 1 can supply power with priority to the second load 62, which needs to be operated over at least the predetermined period. As a result, the power control circuit 1 can back up the second load 62 over the predetermined period while functioning as a backup power source of the first load 61 and the second load 62.

The power control circuit 1 according to one or more embodiments controls opening and closing of the switching elements 16 and 26 based on the terminal voltage of the lithium-ion capacitor 40. Meanwhile, the power control circuit 920 of comparative example 2 has the resistor 925 for detecting the discharge current of the lithium-ion secondary battery 921. The resistor 925 increases power consumption that does not contribute to load backup. Moreover, a circuit per se of the switch controller 922 also consumes power. Increased power consumption in the power control circuit 920 shortens the period for which the load can be backed up. The power control circuit 1 according to one or more embodiments can make the period for which the load can be backed up longer than the power control circuit 920 of comparative example 2.

The lithium-ion capacitor 40 is operable in a wider temperature range than the lithium-ion secondary battery 921. Therefore, if the lithium-ion capacitor 40 were substituted with the lithium-ion secondary battery 921, a temperature range where the power control circuit 1 can operate would be narrowed. By being provided with the lithium-ion capacitor 40, the power control circuit 1 according to one or more embodiments can make the operable temperature range wider than a configuration of being provided with the lithium-ion secondary battery 921. As a result, high convenience can be realized.

The lithium-ion secondary battery 921 self-discharges easily due to a phenomenon wherein dendritic lithium metal is deposited therein. Meanwhile, the lithium-ion capacitor 40 is less likely to self-discharge. Moreover, the electric double-layer capacitor 915 self-discharges more easily than the lithium-ion capacitor 40. Therefore, if the lithium-ion capacitor 40 were substituted with a lithium-ion secondary battery 921 or electric double-layer capacitor 915 of the same charge capacity, the period wherein the power control circuit 1 functions as a backup power source would be shortened. By being provided with the lithium-ion capacitor 40, the power control circuit 1 according to one or more embodiments can make the period of functioning as a backup power source longer than a configuration of being provided with a lithium-ion secondary battery 921 or electric double-layer capacitor 915 of the same capacity. As a result, high convenience can be realized.

The lithium-ion secondary battery 921 degrades and becomes more likely to fail regardless of whether overcharging or over-discharging occurs. Meanwhile, the lithium-ion capacitor 40 does not degrade and become more likely to fail even if overcharging occurs. Therefore, if the lithium-ion capacitor 40 were substituted with the lithium-ion secondary battery 921, the power control circuit 1 would need to be further provided with an overcharging monitoring circuit. Adding an overcharging monitoring circuit could increase a size or cost of the power control circuit 1. By being provided with the lithium-ion capacitor 40, the power control circuit 1 according to one or more embodiments does not need an overcharging monitoring circuit. As a result, a configuration can be simplified.

Over-discharge protection of the lithium-ion capacitor 40 is realized by the power control circuit 1 being provided with the first protection circuit 10 and the second protection circuit 20. That is, the power control circuit 1 can avoid over-discharge by controlling the terminal voltage of the lithium-ion capacitor 40 to not become less than the second voltage.

If the lithium-ion capacitor 40 were substituted with the lithium-ion secondary battery 921, a p-channel MOSFET would have an insufficient performance as the switching element 16 connected to the lithium-ion secondary battery 921. Therefore, an n-channel MOSFET would be used. Using an n-channel MOSFET would necessitate a circuit of the lithium-ion secondary battery 921 to be switched on a ground side. Performing switching on the ground side could cause instability due to a state arising wherein the circuit is not grounded. By being provided with the lithium-ion capacitor 40, the power control circuit 1 according to one or more embodiments can operate stably as a result of performing switching on a high side applied with a voltage instead of performing switching on a ground side. As a result, high convenience can be realized.

The lithium-ion capacitor 40 can have a longer life than the lithium-ion secondary battery 921. Therefore, the power control circuit 1 can be configured on an assumption of not replacing the lithium-ion capacitor 40. When configured on an assumption of not replacing the lithium-ion capacitor 40, the power control circuit 1 can be configured more easily than a replaceable configuration. If the lithium-ion capacitor 40 were substituted with the lithium-ion secondary battery 921, the power control circuit 1 would need to be configured so the lithium-ion secondary battery 921 is replaceable. By being provided with the lithium-ion capacitor 40, the power control circuit 1 according to one or more embodiments can decrease a maintenance frequency. As a result, high convenience can be realized.

If the power control circuit 1 were provided with a primary battery for supplying power to the second load 62 as a configuration separate from the lithium-ion capacitor 40 that backs up the first load 61, the power control circuit 1 would need to be provided with a circuit for connecting the primary battery to the second load 62. Such a circuit could complicate the power control circuit 1 and be more expensive than the second protection circuit 20. Moreover, after the primary battery ends discharge, the power control circuit 1 would become unable to function as a backup power source of the second load 62. By being provided with the lithium-ion capacitor 40, the power control circuit 1 according to one or more embodiments can be configured less expensively and operate over a longer period than a configuration of being provided with a primary battery. As a result, high convenience can be realized.

(Auto-Sleep of Protection Circuits)

In the first protection circuit 10, the voltage detection circuit 11 is connected to the terminal 17, which is connected to the lithium-ion capacitor 40, via the switching element 16. That is, the voltage detection circuit 11 can receive supply of the discharge current from the lithium-ion capacitor 40 via the switching element 16. The first protection circuit 10 places the switching element 16 in the off state when the terminal voltage of the lithium-ion capacitor 40 becomes less than the first voltage. In this situation, the discharge current of the lithium-ion capacitor 40 does not flow to the voltage detection circuit 11. By placing the switching element 16 in the off state, the first protection circuit 10 no longer consumes power. In this situation, compared to when the voltage detection circuit 11 is connected to the terminal 17 without passing through the switching element 16, the first protection circuit 10 no longer consumes the current of the lithium-ion capacitor 40. That is, the first protection circuit 10 no longer needlessly consumes power after the first load 61 is stopped. As a result, the period wherein the lithium-ion capacitor 40 can supply the current to the second load 62 is extended.

In the second protection circuit 20 as well, the voltage detection circuit 21 is connected to the terminal 27, which is connected to the lithium-ion capacitor 40, via the switching element 26. This causes the second protection circuit 20 to no longer consume the current of the lithium-ion capacitor 40 after the terminal voltage of the lithium-ion capacitor 40 becomes less than the second voltage. As a result, a further decrease in the terminal voltage of the lithium-ion capacitor 40 can be avoided. When the terminal voltage of the lithium-ion capacitor 40 is less than the second voltage and decreases further, the lithium-ion capacitor 40 becomes easily degraded. Therefore, suppressing a decrease in the terminal voltage of the lithium-ion capacitor 40 leads to suppressing degradation of the lithium-ion capacitor 40.

(Charging at Power Restoration)

As above, when the terminal voltage of the lithium-ion capacitor 40 becomes less than the first voltage, the switching element 16 enters the off state. As a result, the voltage detection circuit 11 no longer operates.

Here, it is supposed that the external power source 8 restarts power supply when the terminal voltage of the lithium-ion capacitor 40 is less than the first voltage and the switching element 16 is in the off state. It is supposed that the switching element 16 is a p-channel MOSFET.

When the external power supply 8 supplies power at a voltage no less than the first voltage, the switching element 16 enters the on state. In this situation, the current that heads from the external power source 8 to the lithium-ion capacitor 40 can flow in a channel of the p-channel MOSFET.

When charging the lithium-ion capacitor 40 under CCCV (constant current, constant voltage) control, the external power source 8 may supply power at a voltage less than the first voltage according to the terminal voltage of the lithium-ion capacitor 40. In this situation, the switching element 16 remains in the off state. By the switching element 16 (p-channel MOSFET) being in the off state, the current that heads from the external power source 8 to the lithium-ion capacitor 40 cannot flow in the channel of the p-channel MOSFET.

However, as illustrated in FIG. 4, the p-channel MOSFET has a parasitic diode 16a. The parasitic diode 16a is also referred to as a body diode. The switching element 16 (p-channel MOSFET) is connected so a forward direction of the parasitic diode 16a is a direction heading from the terminal 18 to the terminal 17. The current that heads from the external power source 8 to the lithium-ion capacitor 40 can flow through the parasitic diode 16a. This enables the power control circuit 1 according to one or more embodiments to cause the external power source 8 to restart charging of the lithium-ion capacitor 40 without needing a special circuit for restarting charging. As a result, the power control circuit 1 is configured as a simple circuit.

As above, according to the power control circuit 1 according to one or more embodiments, the external power source 8 can charge the lithium-ion capacitor 40 regardless of whether the switching element 16 (p-channel MOSFET) is in the on state or the off state.

It is supposed that the lithium-ion capacitor 40 is substituted with the lithium-ion secondary battery 921. In this situation, to restrict overcharging of the lithium-ion secondary battery 921, it is necessary for no current to flow in the parasitic diode 16a. Therefore, when the lithium-ion secondary battery 921 is substituted in, two MOSFETs connected in series so mutual source-drain directions are reversed are adopted as the switching element 16. This causes no current to flow in the parasitic diode 16a when the switching element 16 is in the off state, and the lithium-ion capacitor 40 is not charged. Therefore, it is only by being provided with the lithium-ion capacitor 40 that the power control circuit 1 according to one or more embodiments can restart charging, regardless of whether the switching element 16 is in the on state or the off state, when the external power source 8 restarts power supply. As a result, reversion at power restoration becomes easy. Moreover, restarting charging by the power control circuit 1 can be realized by a simple circuit.

(Expansion of Usage Temperature Range)

An upper limit and the lower limit of the terminal voltage of the lithium-ion capacitor 40 is established according to a usage temperature of the lithium-ion capacitor 40. When the lithium-ion capacitor 40 is used in a temperature range of T1min to T1max, the upper limit and the lower limit of the terminal voltage are respectively defined as V1max and V1min. Meanwhile, when the lithium-ion capacitor 40 is used in a temperature range of T2min to T2max, the upper limit and the lower limit of the terminal voltage are respectively defined as V2max and V2min. Here, it is supposed that T1max is higher than T2max. It is supposed that V1min is lower than V2min. Under these suppositions, the lower limit of the terminal voltage of the lithium-ion capacitor 40 differs between a situation wherein the temperature of the lithium-ion capacitor 40 exceeds T2max and a situation wherein this is no greater than T2max. Referring to T2max as a predetermined temperature, the lower limit of the terminal voltage is lower in a situation wherein the temperature of the lithium-ion capacitor 40 is no greater than the predetermined temperature compared to a situation wherein the temperature of the lithium-ion capacitor 40 exceeds the predetermined temperature.

Figure 7:
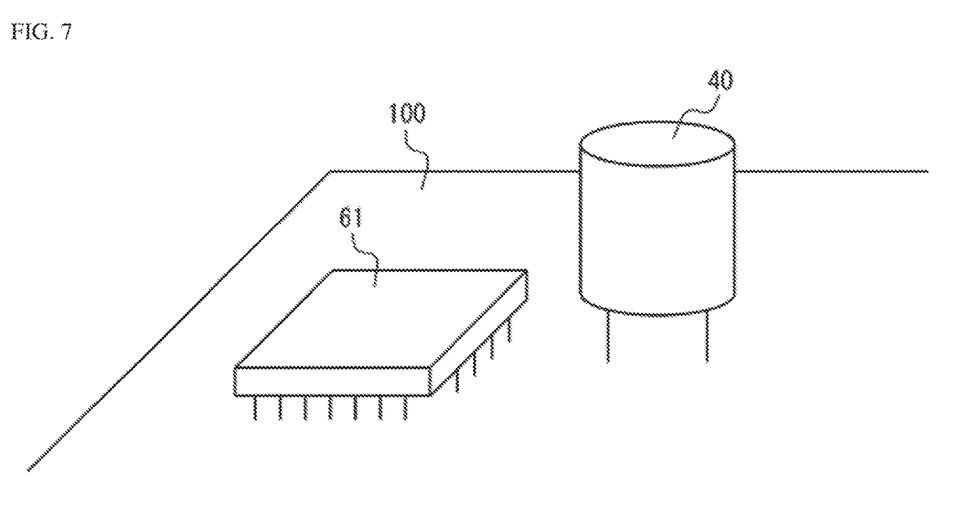
FIG. 7 is a diagram illustrating a configuration example wherein the lithium-ion capacitor and a first load are mounted on a board according to one or more embodiments.

As a specific example, when the lithium-ion capacitor 40 is used in a temperature range of −30° C. to +85° C., the upper limit and the lower limit of the terminal voltage may be respectively defined as 3.5 V and 2.5 V. Meanwhile, when the lithium-ion capacitor 40 is used in a temperature range of −30° C. to +70° C., the upper limit and the lower limit of the terminal voltage may be respectively defined as 3.8 V and 2.2 V. In this example, each variable above is represented as follows:

T1min=−30° C.; T1max=+85° C.
T2min=−30° C.; T2max=+70° C.
V1min=2.5 V; V1max=3.5 V
V2min=2.2 V; V2max=3.8 V As illustrated in FIG. 7, the lithium-ion capacitor 40 may be mounted on a circuit board 100 together with the first load 61. It is supposed that the lithium-ion capacitor 40 is mounted in a position that is affected by heat generation from the first load 61. In this situation, the temperature of the lithium-ion capacitor 40 increases due to heat generation from the operations of the first load 61. That is, the greater a heat generation amount of the first load 61, the higher the temperature of the lithium-ion capacitor 40.

When the first load 61 is operating, the temperature of the lithium-ion capacitor 40 is more likely to exceed the predetermined temperature. Meanwhile, when the first load 61 is stopped, the temperature of the lithium-ion capacitor 40 is more likely to remain no greater than the predetermined temperature.

Here, it is supposed that the predetermined temperature is 70° C. Applying this supposition to the specific example above, when the temperature of the lithium-ion capacitor 40 exceeds 70° C., the lower limit of the terminal voltage is 2.5

V. When the temperature of the lithium-ion capacitor 40 is no greater than 70° C., the lower limit of the terminal voltage is 2.2 V.

It is further supposed that the first voltage is set to 2.5 V and the second voltage is set to 2.2 V. Under this supposition, when the terminal voltage of the lithium-ion capacitor 40 becomes less than the first voltage and the first protection circuit 10 blocks power supply to the first load 61, the first load 61 stopping causes the temperature of the lithium-ion capacitor 40 to become more likely to remain less than the predetermined temperature. This makes it less likely for the terminal voltage of the lithium-ion capacitor 40 to fall below the lower limit even if power supply to the second load 62 continues through the second protection circuit 20 and the terminal voltage of the lithium-ion capacitor 40 decreases to the second voltage.

It can be said that the lithium-ion capacitor 40 is allowed to be mounted in the position that is affected by the heat generation from the first load 61 when the relationship between the temperature and terminal-voltage lower limit of the lithium-ion capacitor 40 and the first voltage and second voltage in the example above is met. The conditions to be met can be reworded as (a) and (b) below:
(a) The lower limit of the terminal voltage of the lithium-ion capacitor 40 corresponds to the first voltage when the temperature of the lithium-ion capacitor 40 is higher than the predetermined temperature.
(b) The lower limit of the terminal voltage of the lithium-ion capacitor 40 corresponds to the second voltage when the temperature of the lithium-ion capacitor 40 is no greater than the predetermined temperature.

By allowing the lithium-ion capacitor 40 to be mounted in the position that is affected by the heat generation from the first load 61, restrictions relating to mounting the power control circuit 1 are decreased. Moreover, it becomes easy to integrate components mounted on the circuit board 100. As a result, a smaller size and a decreased cost can be realized for the power control circuit 1. Moreover, the lithium-ion capacitor 40 is utilized in a voltage range that is as wide as possible within the usage temperature range thereof. As a result, the period of being able to supply power to the second load 62 is extended.

(Self-Stopping Function)

It is supposed that the first load 61 consumes the power amount that the lithium-ion capacitor 40 can supply in about several dozen seconds. Here, it is supposed that the first load 61 is a processor. When power supply from the external power source 8 stops, the first load 61 detects the stopping of the external power source 8 and starts a stopping process for the first load 61 per se. By completing the stopping process while power is being supplied from the lithium-ion capacitor 40, the first load 61 can perform stopping so as to be able to safely restart operations when power supply restarts. The first voltage may be set so the lithium-ion capacitor 40 can be made to continue to discharge until the first load 61 can complete the stopping process.

After the first load 61 stops itself, the regulator 30 no longer needs to supply power to the first load 61. As illustrated by the dashed line in FIG. 3, the first load 61 may be connected to the regulator 30 by a communication line 73. The first load 61 may output a discharge stop signal to the regulator 30 via the communication line 73. The regulator 30 may stop the operation of outputting the power discharged by the lithium-ion capacitor 40 to the first load 61 and the second load 62 based on the discharge stop signal from the first load 61. This decreases, among power consumed by the power control circuit 1, power consumed by the regulator 30. Decreasing the power consumed by the power control circuit 1 increases the power amount that the lithium-ion capacitor 40 can supply to the second load 62. As a result, the period of being able to supply power to the second load 62 is extended.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

1 Power control circuit
8 External power source
10 First protection circuit
11 Voltage detection circuit (12: comparator; 13: reference voltage source; 14: resistor voltage divider; 15: resistor voltage divider; 19: node)
16 Switching element
17, 18 Terminal
20 Second protection circuit
21 Voltage detection circuit
26 Switching element
27, 28 Terminal
30 Regulator
40 Lithium-ion capacitor
51, 52 Diode
61 First load
62 Second load
71, 72 Node
73 Communication line
80 Ground point
100 Circuit board

What is claimed is:
1. A power control circuit comprising:
a lithium-ion capacitor that is charged by power supplied by an external power source;
a first protection circuit that supplies, to a first load that operates using power supplied by the external power source, a first discharge current of the lithium-ion capacitor when the power is no longer supplied from the external power source; and
a second protection circuit that supplies, to a second load that operates using power supplied by the external power source, a second discharge current of the lithium-ion capacitor when the power is no longer supplied from the external power source, wherein
the second load operates at a lower power consumption than the first load over at least a predetermined period,
the first protection circuit stops supplying the first discharge current to the first load when a terminal voltage of the lithium-ion capacitor becomes less than a first voltage,
the second protection circuit stops supplying the second discharge current to the second load when the terminal voltage of the lithium-ion capacitor becomes less than a second voltage that is lower than the first voltage, and
an electrical-charge amount discharged as the terminal voltage of the lithium-ion capacitor falls from the first voltage to the second voltage is no less than an electrical-charge amount required to back up the second load over the predetermined period.
2. The power control circuit of claim 1, wherein
the first protection circuit comprises:
a first switching element that is connected between the lithium-ion capacitor and the first load; and a first voltage detection circuit that controls the first switching element, and the first voltage detection circuit:
operates using a current supplied from the lithium-ion capacitor via the first switching element when power is no longer supplied from the external power source,
maintains the first switching element in an on state when the terminal voltage of the lithium-ion capacitor is no less than the first voltage, and
transitions the first switching element to an off state when the terminal voltage of the lithium-ion capacitor becomes less than the first voltage.

3. The power control circuit according to claim 2, wherein the lithium-ion capacitor is mounted on a circuit board together with the first load,
a temperature of the lithium-ion capacitor increases as a heat generation amount of the first load increases,
a lower limit of the terminal voltage of the lithium-ion capacitor is equal to the first voltage when the temperature of the lithium-ion capacitor is higher than a predetermined temperature, and
the lower limit corresponds to the second voltage when the temperature of the lithium-ion capacitor is no greater than the predetermined temperature.

4. The power control circuit according to claim 1, wherein the lithium-ion capacitor is mounted on a circuit board together with the first load,
a temperature of the lithium-ion capacitor increases as a heat generation amount of the first load increases,
a lower limit of the terminal voltage of the lithium-ion capacitor is equal to the first voltage when the temperature of the lithium-ion capacitor is higher than a predetermined temperature, and
the lower limit corresponds to the second voltage when the temperature of the lithium-ion capacitor is no greater than the predetermined temperature.

5. A power control circuit comprising:
a lithium-ion capacitor that is charged by power supplied by an external power source;
a first protection circuit that supplies, to a first load that operates using power supplied by the external power source, a first discharge current of the lithium-ion capacitor when the power is no longer supplied from the external power source; and
a second protection circuit that supplies, to a second load that operates using power supplied by the external power source, a second discharge current of the lithium-ion capacitor when the power is no longer supplied from the external power source, wherein
the second load operates at a lower power consumption than the first load,
the first protection circuit stops supplying the first discharge current to the first load when a terminal voltage of the lithium-ion capacitor becomes less than a first voltage,
the second protection circuit stops supplying the second discharge current to the second load when the terminal voltage of the lithium-ion capacitor becomes less than a second voltage that is lower than the first voltage,
the first protection circuit comprises:
a first switching element that is connected between the lithium-ion capacitor and the first load; and
a first voltage detection circuit that controls the first switching element, and the first voltage detection circuit:
operates using a current supplied from the lithium-ion capacitor via the first switching element when power is no longer supplied from the external power source,
maintains the first switching element in an on state when the terminal voltage of the lithium-ion capacitor is no less than the first voltage, and
transitions the first switching element to an off state when the terminal voltage of the lithium-ion capacitor becomes less than the first voltage,
the lithium-ion capacitor is connected to the external power source via the first switching element,
the first switching element comprises a parasitic diode, and
when the first switching element is transitioned to the off state, a current heading from the external power source to the lithium-ion capacitor flows via the parasitic diode.

6. The power control circuit according to claim 5, wherein the lithium-ion capacitor is mounted on a circuit board together with the first load,
a temperature of the lithium-ion capacitor increases as a heat generation amount of the first load increases,
a lower limit of the terminal voltage of the lithium-ion capacitor corresponds to the first voltage when the temperature of the lithium-ion capacitor is higher than a predetermined temperature, and
the lower limit corresponds to the second voltage when the temperature of the lithium-ion capacitor is no greater than the predetermined temperature.

7. A power control circuit comprising:
a lithium-ion capacitor that is charged by power supplied by an external power source;
a first protection circuit that supplies, to a first load that operates using power supplied by the external power source, a first discharge current of the lithium-ion capacitor when the power is no longer supplied from the external power source; and
a second protection circuit that supplies, to a second load that operates using power supplied by the external power source, a second discharge current of the lithium-ion capacitor when the power is no longer supplied from the external power source, wherein
the second load operates at a lower power consumption than the first load,
the first protection circuit stops supplying the first discharge current to the first load when a terminal voltage of the lithium-ion capacitor becomes less than a first voltage,
the second protection circuit stops supplying the second discharge current to the second load when the terminal voltage of the lithium-ion capacitor becomes less than a second voltage that is lower than the first voltage,
the lithium-ion capacitor is mounted on a circuit board together with the first load,
a temperature of the lithium-ion capacitor increases as a heat generation amount of the first load increases,
a lower limit of the terminal voltage of the lithium-ion capacitor is equal to the first voltage when the temperature of the lithium-ion capacitor is higher than a predetermined temperature, and
the lower limit corresponds to the second voltage when the temperature of the lithium-ion capacitor is no greater than the predetermined temperature.

* * * * *